(12) United States Patent
Blunier et al.

(10) Patent No.: US 10,648,502 B2
(45) Date of Patent: May 12, 2020

(54) TRUNNION ASSEMBLY

(71) Applicant: CNH Industrial America LLC, New Holland, PA (US)

(72) Inventors: Timothy R. Blunier, Danvers, IL (US); Gaylen J. Kromminga, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 800 days.

(21) Appl. No.: 15/239,927

(22) Filed: Aug. 18, 2016

(65) Prior Publication Data
US 2018/0051740 A1  Feb. 22, 2018

(51) Int. Cl.
*F16C 11/02* (2006.01)
(52) U.S. Cl.
CPC .......... *F16C 11/02* (2013.01); *F16C 2226/60* (2013.01); *F16C 2300/02* (2013.01)
(58) Field of Classification Search
CPC ......... F16C 11/02; F16C 11/04; F16C 11/045; Y10T 403/32122; Y10T 403/32606; Y10T 403/32622; Y10T 403/32868; Y10T 403/32893
See application file for complete search history.

(56) References Cited

U.S. PATENT DOCUMENTS

| | | | | |
|---|---|---|---|---|
| 692,288 A * | 2/1902 | Holdsworth | ............... | F16J 1/16 403/147 |
| 2,969,661 A | 1/1961 | Swanson | | |
| 3,062,253 A | 11/1962 | Millheiser | | |
| 3,746,067 A | 7/1973 | Gulistan | | |
| 3,964,799 A * | 6/1976 | Knapp | ..................... | F16C 11/02 384/129 |
| 3,994,200 A | 11/1976 | Swanson | | |
| 4,043,000 A * | 8/1977 | Bunker | ................. | E05D 7/1044 16/384 |
| 4,491,436 A * | 1/1985 | Easton | .................... | E02F 9/006 403/122 |

(Continued)

FOREIGN PATENT DOCUMENTS

| | | | | |
|---|---|---|---|---|
| EP | 1 850 045 A1 | 10/2007 | | |
| FR | 3038007 B1 * | 7/2017 | ............. | F02K 1/123 |

(Continued)

*Primary Examiner* — Jonathan P Masinick
(74) *Attorney, Agent, or Firm* — Rebecca L. Henkel; Rickard K. DeMille

(57) ABSTRACT

A trunnion assembly, comprising at least two pivot-engagement sides located opposite each other, each of the at least two pivot-engagement sides including an attachment hole, each attachment hole including a threaded area and a counterbore, the at least two attachment holes being generally coaxially located relative to each other; and at least one through-hole perpendicular to and midway between the two attachment holes of the pivot-engagement sides; a fastener releasably attached to each of the at least two attachment holes, the fastener including a head and an at least partially-threaded shaft, and a pivot tube disposed around each of the fasteners between the head and the attachment hole, the pivot tube including an inner diameter larger than the diameter of the shaft and an outer diameter smaller than the diameter of a circumscribed circle of the head of the fastener and smaller than the diameter of the counterbore.

15 Claims, 3 Drawing Sheets

(56) References Cited

U.S. PATENT DOCUMENTS

| | | | | |
|---|---|---|---|---|
| 4,652,167 | A * | 3/1987 | Garman | F16C 11/02 29/434 |
| 5,853,227 | A * | 12/1998 | Schmidt, III | A63C 17/22 301/5.7 |
| 5,906,029 | A * | 5/1999 | Fox | F16C 11/02 16/221 |
| 5,971,651 | A * | 10/1999 | Gornick | F16C 11/045 403/14 |
| 6,238,127 | B1 * | 5/2001 | Jhumra | F16B 5/02 403/282 |
| 6,668,501 | B2 | 12/2003 | Adebar et al. | |
| 7,628,042 | B2 * | 12/2009 | Miglio | D06F 37/20 68/3 R |
| 8,333,526 | B2 * | 12/2012 | Long | F16D 3/38 403/57 |
| 8,777,537 | B2 | 7/2014 | Fritsch | |
| 9,580,163 | B2 * | 2/2017 | Sun | B64C 9/02 |
| 9,863,468 | B2 * | 1/2018 | Halcom | F16C 11/045 |
| 2007/0189649 | A1 * | 8/2007 | Montazeri | F16C 11/0614 384/192 |
| 2015/0322993 | A1 | 11/2015 | Brewer | |
| 2016/0146571 | A1 * | 5/2016 | Howard | F41C 23/02 403/57 |

FOREIGN PATENT DOCUMENTS

| | | | | |
|---|---|---|---|---|
| WO | 92/04547 A1 | 3/1992 | | |
| WO | WO-2010149848 A1 * | 12/2010 | | E02F 9/006 |
| WO | 2012/047103 A1 | 4/2012 | | |
| WO | 2014/198385 A1 | 12/2014 | | |

* cited by examiner

TRUNNION ASSEMBLY

BACKGROUND OF THE INVENTION

1. Field of the Invention

The present invention relates to trunnions, and, more particularly, to a trunnion assembly.

2. Description of the Related Art

Trunnions are mechanical devices that provide a way for parts to be supported and pivoted relative to one another. One or more cylindrical appendages protrude from a main body in order to provide support and movement. The main body can be functional itself, or can serve as the mounting for numerous applications.

The cylindrical protrusions on trunnion assemblies can be integrated into the main body or be separate components. For example, a cannon trunnion has two cylindrical pivot points cast into the barrel itself. On the other hand, a bearing trunnion assembly may include pins or bolts used as the pivoting components.

Because of the movement of the pivoting points on their complementary receivers, as well as the relatively smaller pivots compared to the main body size, significant stresses may be placed upon the pivots and they may fail.

What is needed in the art is a trunnion assembly that is able to withstand high stresses placed upon the pivot features.

SUMMARY OF THE INVENTION

The present invention provides a trunnion assembly including pivot-engagement components able to withstand high stresses.

The present invention in one form is directed to a trunnion assembly, comprising a main body including at least two pivot-engagement sides located opposite each other, each of the at least two pivot-engagement sides including an attachment hole, each attachment hole including a threaded area and a counterbore, the at least two attachment holes being generally coaxially located relative to each other; a fastener releasably attached to each of the at least two attachment holes, the fastener including a head and an at least partially-threaded shaft, the head having a diameter of a circumscribed circle which is larger than a diameter of the shaft; and a pivot tube disposed around each of the fasteners between the head and the attachment hole, the pivot tube including an inner diameter larger than the diameter of the shaft and an outer diameter smaller than the diameter of a circumscribed circle of the head and smaller than the diameter of the counterbore.

The present invention in another form is directed to a method of assembling a trunnion, the method comprising providing a trunnion assembly, the trunnion assembly including a main body including at least two pivot-engagement sides located opposite each other, each of the at least two pivot-engagement sides including an attachment hole, each attachment hole including a threaded area and a counterbore, the at least two attachment holes being generally coaxially located relative to each other; a fastener for each of the at least two attachment holes, the fastener including a head and an at least partially-threaded shaft, the head having a diameter of a circumscribed circle which is larger than a diameter of the shaft; and a pivot tube including an inner diameter larger than the diameter of the shaft and an outer diameter smaller than the diameter of a circumscribed circle of the head of the fastener and smaller than the diameter of the counterbore; inserting the threaded shaft of each fastener through the corresponding pivot tube; and threading each fastener into the corresponding attachment hole of the main body and tightening it until secured.

An advantage of the present invention is that it is easily assembled, manufacturable, cleanable, and serviceable.

Another advantage of the present invention is that it allows assembly after welding and painting of the linkage is completed.

Another advantage of the present invention is the ability to strengthen the assembly in the direction of bending stress, and to increase the shear strength of the pivot diameters. A pivot tube partially inserted into the main body helps withstand shear and bending forces that could damage a fastener without such a pivot tube.

Yet another advantage of the present invention is the ability to size the various components in order to achieve the desired overall strength characteristics for the application.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
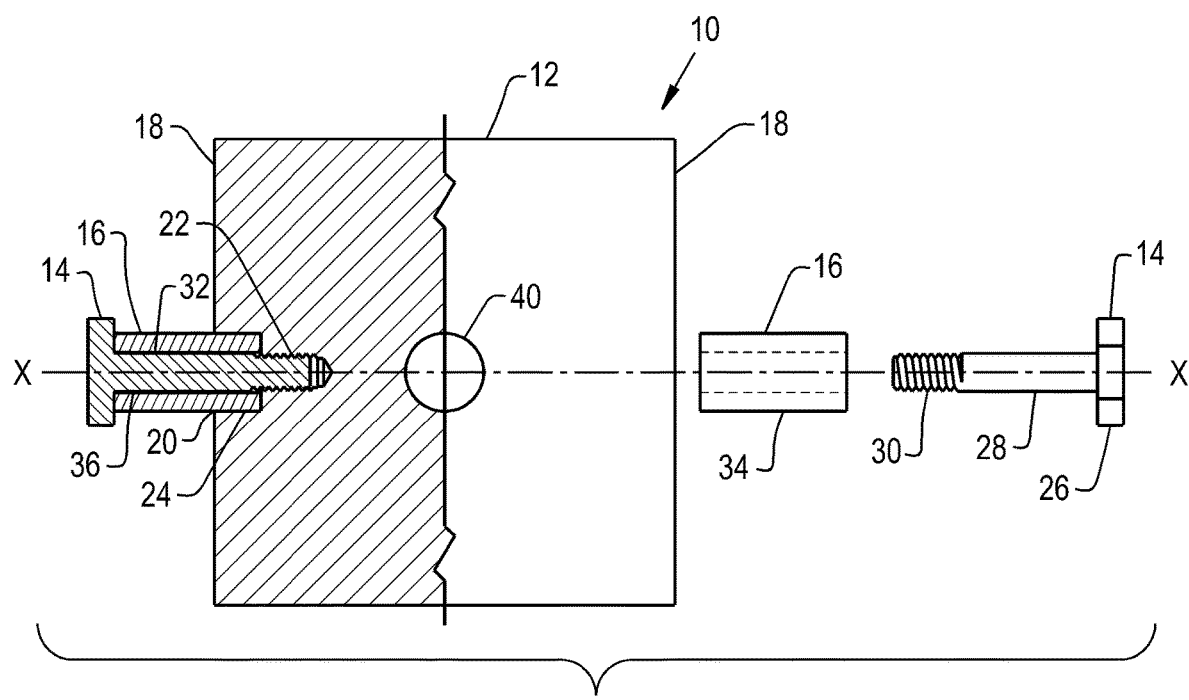
FIG. 1 is a front section/exploded view of an embodiment of a trunnion assembly of the present invention.

Referring now to FIG. 1, there is shown an embodiment of trunnion assembly 10 according to the present invention. Trunnion assembly 10 includes main body 12, fastener 14, and pivot tube 16. Trunnion assembly 10 is shown in both sectioned view as well as exploded view for ease of explanation.

Main body 12 of trunnion assembly 10 can be any configuration: round, square, rectangular, ovoid, etc. Generally, trunnion assembly 10 is symmetric in that pivot-engaging features are in pairs and on opposite sides of each other. Main body 12 is typically comprised of metal, but can be any material. Main body 12 can be produced by any well-known manufacturing method including casting, forging, machining, etc.

Main body 12 includes at least two pivot-engagement sides 18 opposite and generally coaxially located relative to each other. Each of the at least two pivot-engagement sides 18 include an attachment hole 20. Each attachment hole 20 includes threaded area 22 and counterbore 24, the diameter of counterbore 24 being larger than the diameter of threaded area 22. For each pair of attachment holes, each of the two attachment holes is located on a common pivot axis X-X.

Fastener 14 includes head 26 and shaft 28. Shaft 28 may be fully threaded or have a threaded end 30, as shown. Fastener 14 can be a hex bolt, for example. The diameter of a circumscribed circle (i.e., the smallest-diameter circle that encompasses the entire perimeter) around head 26 is larger than the diameter of shaft 28. Fastener 14 is typically comprised of metal, but can be any material. Fastener 14 can be produced by any well-known manufacturing method including casting, forging, machining, etc.

Pivot tube 16 includes a though-hole 32, an outer diameter 34, and an inner diameter 36. Inner diameter 36 of pivot tube 16 is larger than the diameter of shaft 28 of fastener 14; outer diameter 34 of pivot tube 16 is smaller than the diameter of a circumscribed circle around head 26 of fastener 14 and smaller than the diameter of counterbore 24 of main body 12. Pivot tube 16 can be made from any material that lends itself well to providing a strong element upon which pivoting motion will occur efficiently; such materials can include metals and plastics. Pivot tube 16 can be produced by any well-known manufacturing method, including machining.

Main body 12 further includes a through-hole 40 perpendicular to and midway between the two attachment holes 20 of the pivot-engagement sides 18. The purpose of through-hole 40 is to provide an attachment location for various implements that may require a trunnion assembly. Such implements can include rods, turnbuckles, shafts, etc. Through-hole 40 may be threaded or non-threaded.

With continued reference to FIG. 1, trunnion assembly 10 is assembled as follows. For each of the at least two attachment holes 20 on main body 12, the shaft 28 of a fastener 14 is inserted through a pivot tube 16. The fastener 14 is then releasably attached to main body 12 by threading threaded end 30 into the threaded area 22 of attachment hole 20 until secured. Simultaneously, a portion of pivot tube 16 is inserted into the counterbore 24 of attachment hole 20. Because the outer diameter 34 of pivot tube 16 is smaller than the diameter of a circumscribed circle around head 26 of fastener 14 and smaller than the diameter of the counterbore 24 of main body 12, it is captured between head 26 and main body 12. A corresponding mating component that pivots on the pivot tube 16 can be introduced before or after the assembly of trunnion assembly 10 described above.

As stated previously, it is advantageous to have pivot tube 16 partially inserted into the counterbore 24 of attachment hole 20, as stresses normally seen in the threaded area 22 are transferred to the larger diameter counterbore 24. To be capable of adequately handling the stresses, the diameter of counterbore 24 may be at least equal to the depth of counterbore 24.

Figure 2:
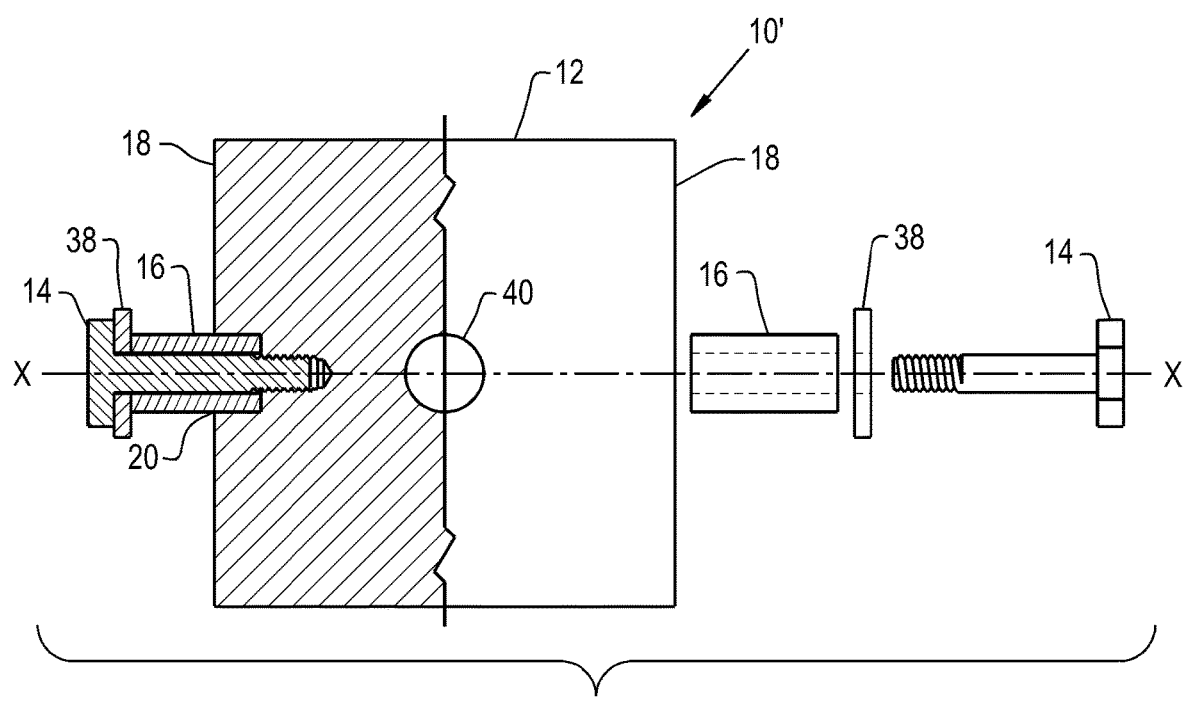
FIG. 2 is a front section/exploded view of an alternate embodiment of a trunnion assembly of the present invention.

Now referring to FIG. 2 with continued referral to FIG. 1, an alternate embodiment of the trunnion assembly of FIG. 1 is described and denoted as trunnion assembly 10'. Washer 38 is disposed on fastener 14 between fastener head 26 and pivot tube 16 prior to assembly. The inner diameter of washer 38 is larger than the diameter of fastener shaft 28, and smaller than the diameter of a circumscribed circle of fastener head 26 and outer diameter 34 of pivot tube 16. All other components are the same as in FIG. 1. The purpose of washer 38 is to provide a solid construct in the event that fastener head 26 is small or does not provide proper coverage over the end of pivot tube 16. Washer 38 is typically comprised of metal, but can be any material. Washer 38 can be produced by any well-known manufacturing method including casting, forging, machining, etc.

Figure 3:
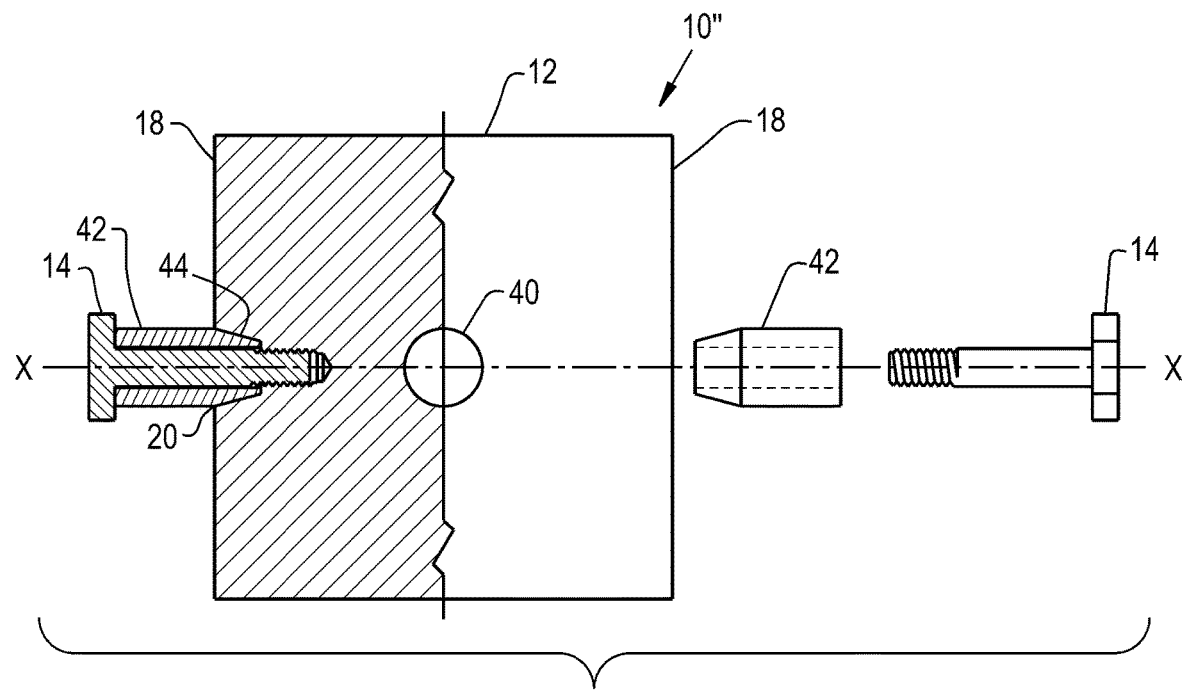
FIG. 3 is a front section/exploded view of an alternate embodiment of a trunnion assembly of the present invention.

Now referring to FIG. 3 with continued referral to FIG. 1, another alternate embodiment of the trunnion assembly of FIG. 1 is described and denoted as trunnion assembly 10". In this embodiment, pivot tube 16 is replaced by tapered pivot tube 42, and counterbore 24 is replaced by countersink 44. All other components are the same as in FIG. 1. The angle of the tapered end of pivot tube 16 complements the angle of the taper in countersink 44, in that a frictional fit is achieved when fastener 14 is tightened into attachment hole 20, which may be beneficial in providing greater strength.

Figure 4:
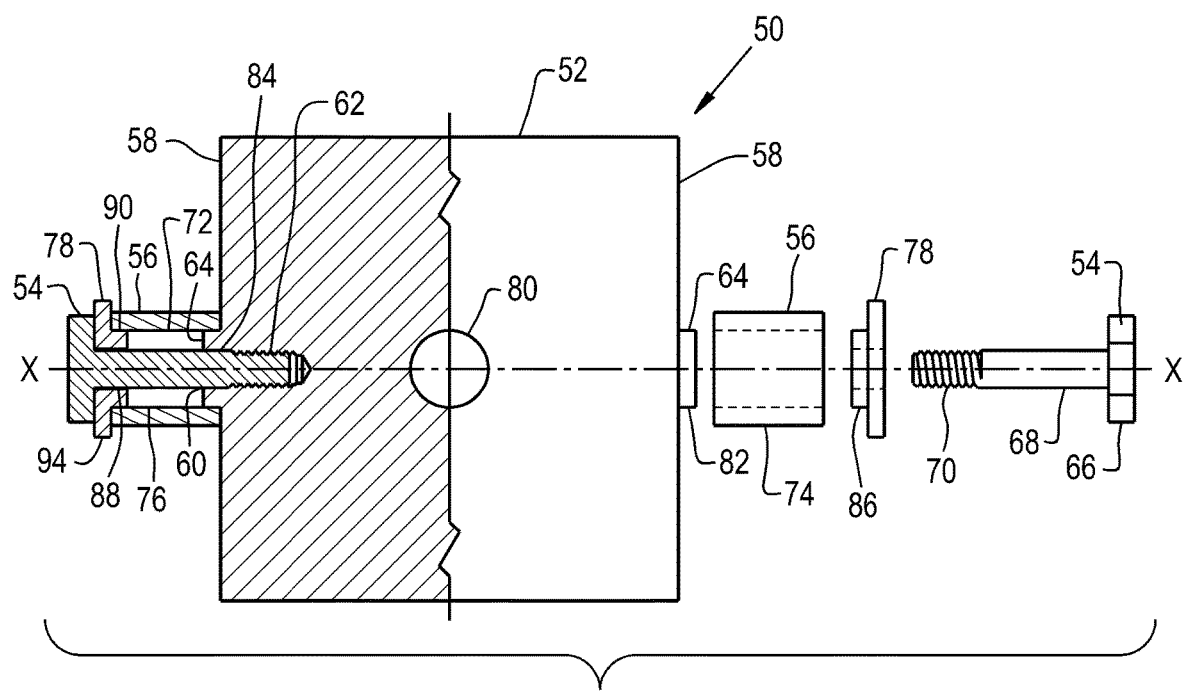
FIG. 4 is a front section/exploded view of an alternate embodiment of a trunnion assembly of the present invention.

Now referring to FIG. 4, there is shown an alternate embodiment of trunnion assembly 50 according to the present invention. Trunnion assembly 50 includes main body 52, fastener 54, pivot tube 56, and washer 78. Trunnion assembly 50 is shown in both sectioned view as well as exploded view for ease of explanation.

Main body 52 of trunnion assembly 50 can be any configuration: round, square, rectangular, ovoid, etc. Generally, trunnion assembly 50 is symmetric in that pivot-engaging features are in pairs and on opposite sides of each other. Main body 52 is typically comprised of metal, but can be any material. Main body 52 can be produced by any well-known manufacturing method including casting, forging, machining, etc.

Main body 52 includes at least two pivot-engagement sides 58 located opposite each other. Each of the at least two pivot-engagement sides 58 include an attachment hole 60. Each attachment hole 60 includes threaded area 62 and boss 64. Boss 64 includes an outer diameter 82 and an inner diameter 84. Inner diameter 84 is the same as or larger than the inner diameter of attachment hole 60, and is concentric with attachment hole 60. For each pair of attachment holes, each of the two attachment holes is located on a common pivot axis X-X.

Fastener 54 includes head 66 and shaft 68. Shaft 68 may be fully threaded or have a threaded end 70, as shown. Fastener 54 can be a hex bolt, for example. The diameter of a circumscribed circle around head 66 is larger than the diameter of shaft 68. Fastener 54 is typically comprised of metal, but can be any material. Fastener 54 can be produced by any well-known manufacturing method including casting, forging, machining, etc.

Pivot tube 56 includes a though-hole 72, an outer diameter 74, and an inner diameter 76. Inner diameter 76 of pivot tube 56 is larger than outer diameter 82 of boss 64 of main body 52 and outer diameter 90 of boss 86 of washer 78 (see below); outer diameter 74 of pivot tube 56 is smaller than the overall diameter 94 of washer 78. Pivot tube 56 can be made from any material that lends itself well to providing a strong element upon which pivoting motion will occur efficiently; such materials can include metals and plastics. Pivot tube 56 can be produced by any well-known manufacturing method, including machining.

Washer 78 includes a boss 86 with inner diameter 88 and outer diameter 90. Inner diameter 88 of boss 86 is smaller than inner diameter 76 of pivot tube 56, and larger than the diameter of fastener shaft 54. The purpose of washer 78 is to provide a solid construct to secure pivot tube 56. Washer 78 is typically comprised of metal, but can be any material. Washer 78 can be produced by any well-known manufacturing method including casting, forging, machining, etc.

Main body 52 further includes a through-hole 80 perpendicular to and midway between the two attachment holes 60 of the pivot-engagement sides 58. The purpose of through-hole 80 is to provide an attachment location for various implements that require need a trunnion assembly. Such implements can include rods, turnbuckles, shafts, etc. Through-hole 80 may be threaded or non-threaded.

With continued reference to FIG. 4, trunnion assembly 50 is assembled as follows. For each of the at least two attachment holes 60 on main body 52, the shaft 68 of a fastener 54 is inserted through a washer 78 and then a pivot tube 56. The fastener 54 is then releasably attached to main body 52 by threading threaded end 70 into the threaded area 62 of attachment hole 60 until secured. Simultaneously, pivot tube 56 is secured by virtue of its inner diameter 76 fitting over the outer diameter 82 of main body boss 64 and the outer diameter 90 of washer boss 86. A corresponding mating component that pivots on the pivot tube 56 can be introduced before or after the assembly of trunnion assembly 50 described above.

Figure 5:
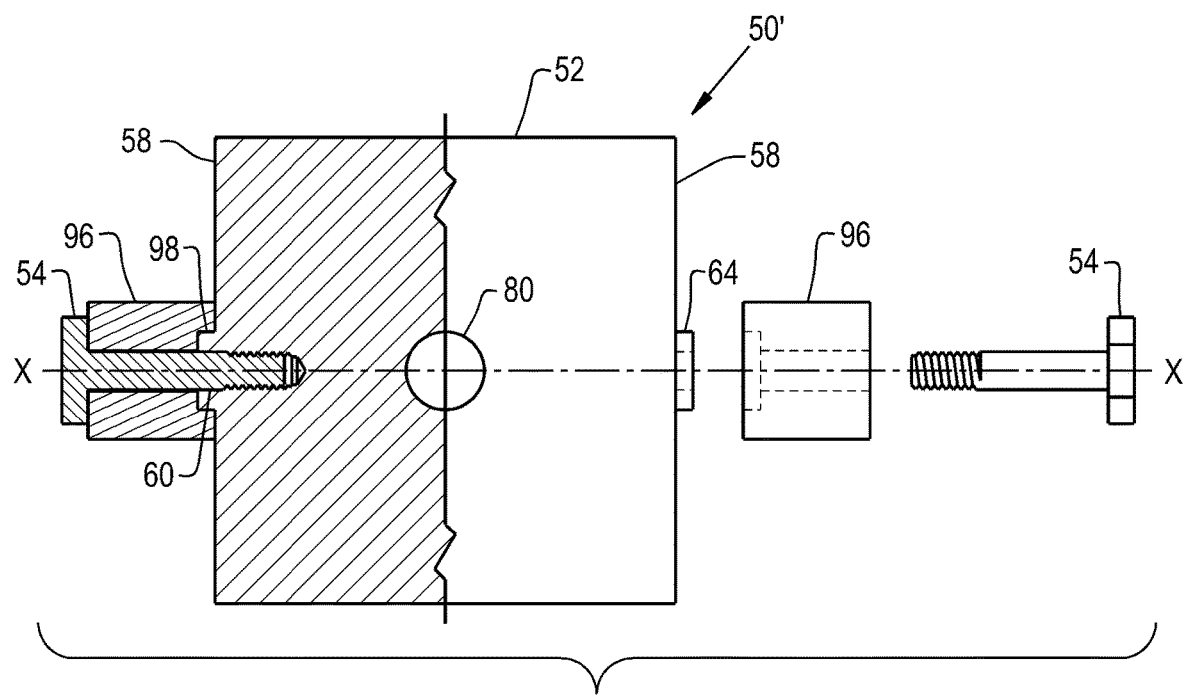
FIG. 5 is a front section/exploded view of an alternate embodiment of a trunnion assembly of the present invention.

Now referring to FIG. 5 with continued referral to FIG. 4, an alternate embodiment of the trunnion assembly of FIG. 4 is described and denoted as trunnion assembly 50'. In this embodiment, there is no washer. Instead, pivot tube 96 includes counterbore 98 to fit over main body boss 64, and is retained by fastener head 66. That is, the diameter of counterbore 98 is larger than outer diameter 82 of main body boss 64.

Figure 6:
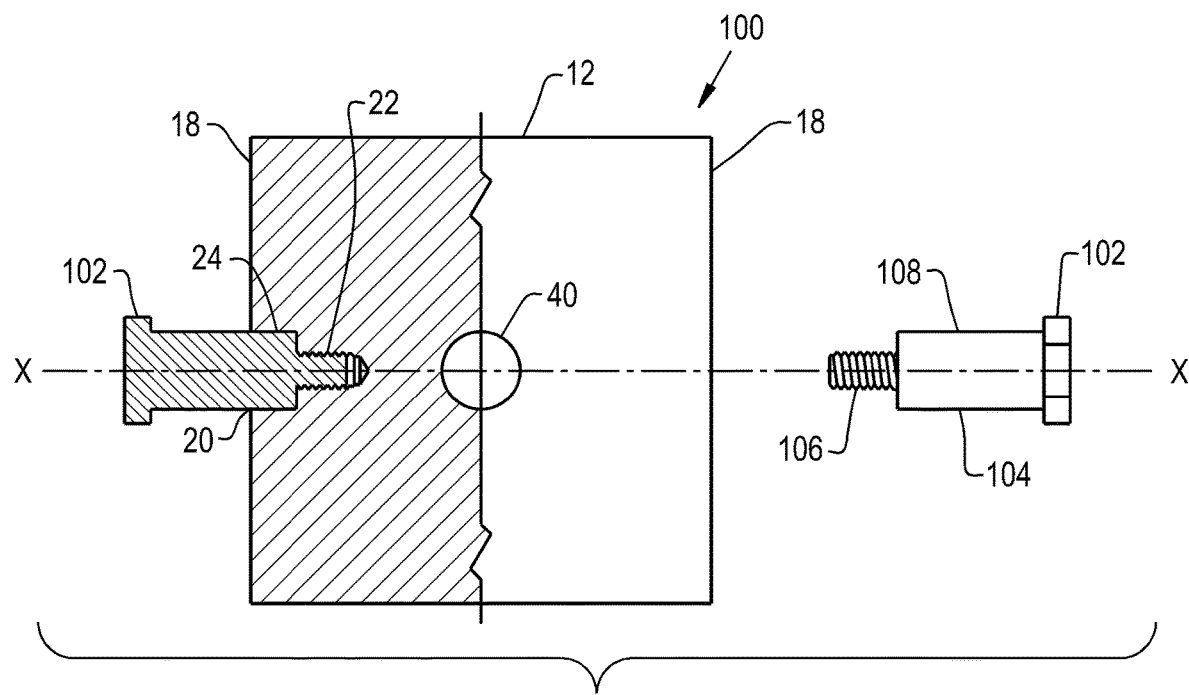
FIG. 6 is a front section/exploded view of an alternate embodiment of a trunnion assembly of the present invention.

Now referring to FIG. 6 with continued referral to FIG. 1, an alternate embodiment of the trunnion assembly of FIG. 1 is described and denoted as trunnion assembly 100. Trunnion assembly 100 is shown in both sectioned view as well as exploded view for ease of explanation. Trunnion assembly 100 includes main body 12 and stepped fastener 102. In this embodiment, stepped fastener 102 is the sole implement upon which other components will pivot; that is, no pivot tube 16 is required. Stepped fastener 102 includes shaft 104, threaded end 106, and pivot diameter 108. All other components are the same as in FIG. 1. The diameter of pivot diameter 108 is less than the diameter of attachment hole 20 counterbore 24. Stepped fastener 102 is typically comprised of metal, but can be any material. Stepped fastener 102 can be produced by any well-known manufacturing method including casting, forging, machining, etc.

For assembly of trunnion assembly 100, stepped fastener 102 is releasably attached to main body 12 by threading threaded end 106 into the threaded area 22 of attachment hole 20 until secured. Simultaneously, a portion of stepped fastener 102 is captured within the counterbore 24 of attachment hole 20. A corresponding mating component that pivots on the pivot tube 16 can be introduced before or after the assembly of trunnion assembly 10 described above.

While trunnion assemblies have been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A trunnion assembly, comprising:
a main body including at least two pivot-engagement sides located opposite each other, each of the at least two pivot-engagement sides including an attachment hole, each attachment hole including a threaded area and a counterbore, the counterbore having a depth and a diameter, the at least two attachment holes being generally coaxially located relative to each other;
a fastener releasably attached to each of the at least two attachment holes, the fastener including a head and an at least partially-threaded shaft, the head having a diameter of a circumscribed circle which is larger than a diameter of the shaft; and
a pivot tube disposed around each of the fasteners between the head and the attachment hole, the pivot tube including an inner diameter larger than the diameter of the shaft and an outer diameter smaller than a diameter of a circumscribed circle of the head of the fastener and smaller than the diameter of the counterbore,
wherein the main body further includes a boss on each of the pivot-engagement sides that is coaxial with the attachment holes, the boss including a through-hole, and
comprising a washer disposed on each of the fasteners between the head and the pivot tube, the washer including a boss with a through-hole, the outer diameter of the washer boss being smaller than the inner diameter of the pivot tube, and the inner diameter of the washer boss being larger than the diameter of the shaft and smaller than the diameter of a circumscribed circle of the fastener head.

2. The trunnion assembly of claim 1, the main body further including at least one through-hole perpendicular to and midway between the two attachment holes of the pivot-engagement sides.

3. The trunnion assembly of claim 1, further comprising a washer disposed around each of the fasteners between the head and the pivot tube, the washer including an internal diameter larger than the diameter of the shaft and smaller than the diameter of a circumscribed circle of the fastener head and the outer diameter of the pivot tube.

4. The trunnion assembly of claim 1, wherein the fastener is a hex bolt.

5. The trunnion assembly of claim 1, wherein the counterbore is a countersink, and the pivot tube includes a tapered end for insertion into the countersink, whereby the countersink and tapers are capable of providing a frictionally tight fit between the pivot tube and the main body when the fastener is attached to the main body.

6. The trunnion assembly of claim 1, wherein the inner diameter of the pivot tube is larger than the outer diameter of the boss on each side of the pivot-engagement sides.

7. The trunnion assembly of claim 1, wherein the pivot tube includes a counterbore, the diameter of the counterbore being greater than the outer diameter of the boss, the inner diameter of the pivot tube being larger than the diameter of the fastener shaft and smaller than the diameter of a circumscribed circle of the fastener head.

8. The trunnion assembly of claim 1, wherein the depth of the counterbore is at least equal to the diameter of the counterbore.

9. A trunnion assembly, comprising:
a main body including at least two pivot-engagement sides located opposite each other, each of the at least two pivot-engagement sides including an attachment hole, each attachment hole including a threaded area and a counterbore, the counterbore having a depth and a diameter, the at least two attachment holes being generally coaxially located relative to each other;
a fastener releasably attached to each of the at least two attachment holes, the fastener including a head and an at least partially-threaded shaft, the head having a diameter of a circumscribed circle which is larger than a diameter of the shaft; and a pivot tube disposed around each of the fasteners between the head and the attachment hole, the pivot tube including an inner diameter larger than the diameter of the shaft and an outer diameter smaller than a diameter of a circumscribed circle of the head of the fastener and smaller than the diameter of the counterbore, wherein the main body further includes a boss on each of the pivot-engagement sides that is coaxial with the attachment holes, the boss including a through-hole, and wherein the pivot tube includes a counterbore, the diameter of the counterbore being greater than the outer diameter of the boss, the inner diameter of the pivot tube being larger than the diameter of the fastener shaft and smaller than the diameter of a circumscribed circle of the fastener head.

10. The trunnion assembly of claim 9, the main body further including at least one through-hole perpendicular to and midway between the two attachment holes of the pivot-engagement sides.

11. The trunnion assembly of claim 9, further comprising a washer disposed around each of the fasteners between the head and the pivot tube, the washer including an internal diameter larger than the diameter of the shaft and smaller than the diameter of a circumscribed circle of the fastener head and the outer diameter of the pivot tube.

12. The trunnion assembly of claim 9, wherein the fastener is a hex bolt.

13. The trunnion assembly of claim 9, wherein the counterbore is a countersink, and the pivot tube includes a tapered end for insertion into the countersink, whereby the countersink and tapers are capable of providing a frictionally tight fit between the pivot tube and the main body when the fastener is attached to the main body.

14. The trunnion assembly of claim 9, wherein the inner diameter of the pivot tube is larger than the outer diameter of the boss on each side of the pivot-engagement sides.

15. The trunnion assembly of claim 9, wherein the depth of the counterbore is at least equal to the diameter of the counterbore.

\* \* \* \* \*